W. J. GILLESPIE.
PAN FOR BAKING BREAD.
APPLICATION FILED JAN. 17, 1912.
1,050,449.
Patented Jan. 14, 1913.
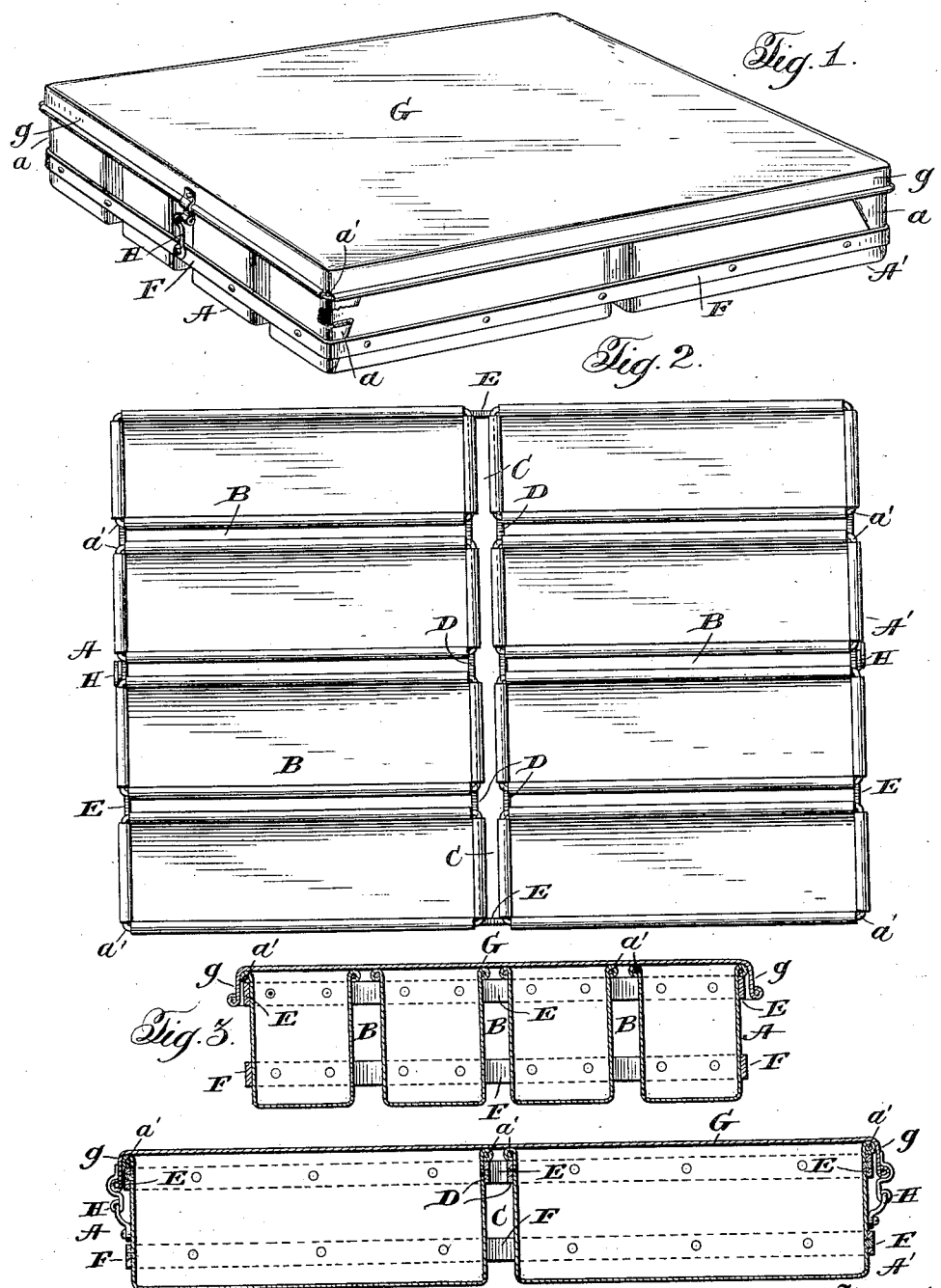
Witnesses:
Jas. E. Hutchinson
Grace W. Marvin
Inventor:
William J. Gillespie,
By Bacon & Milans
Attorneys

UNITED STATES PATENT OFFICE.

WILLIAM J. GILLESPIE, OF TOGUS, MAINE.

PAN FOR BAKING BREAD.

1,050,449.   Specification of Letters Patent.   Patented Jan. 14, 1913.

Application filed January 17, 1912. Serial No. 671,639.

*To all whom it may concern:*

Be it known that I, WILLIAM J. GILLESPIE, a citizen of the United States, residing at Togus, in the county of Kennebec and State of Maine, have invented certain new and useful Improvements in Pans for Baking Bread, of which the following is a specification, reference being had therein to the accompanying drawing.

This invention relates to pans for baking bread and has for its object the provision of a closed pan adapted to confine the hot air and steam generated in the baking process within the pans to keep the bread soft and crustless, enabling the production of what may be properly styled a crustless loaf.

The invention further has for an object the provision of a plurality or nest of sections, each constituting an individual pan, but the whole constituting a unit adapted to be closed by a suitable cover common to all of the sections.

While the invention is capable of embodiment in many forms and arrangements, as will appeal to workers in the bread making art, I will herein illustrate simply the preferred embodiment of the invention in the accompanying drawings forming part hereof, the details of which will be apparent from the specific description hereinafter contained.

In the drawings, Figure 1 is a perspective view of the pan in its closed or baking condition; Fig. 2 is a top view with the cover removed, Fig. 3 is a transverse sectional view of Fig. 1, and, Fig. 4 is a longitudinal sectional view of the same, both taken in a vertical plane.

Referring more specifically to the drawings wherein like reference characters designate corresponding parts in the several views, A, A' represent two series of pans,—each series comprising four pans, although any desired number may be employed,—each pan being of oblong shape and the two series being disposed in endwise or longitudinal relation. The body of each pan is conveniently formed of sheet metal having the side and end walls thereof bent up from the bottom and double seamed at the corners $a$ to provide a smooth interior. The walls of the pan are not flaring or inclined, as usual, but are vertical so that the pan is of the same dimensions at its top and bottom. The upper edge of the pan is rolled over or beaded, strengthened with a core, if desired, as at $a'$.

In their operative relation the pans of each series are separated from each other by intermediate spaces B and the adjacent ends of the two series of pans are similarly separated by spaces C, thus to expose the entire surrounding wall of each pan to the heat in the oven. The means for maintaining the pans and sections in the relation to which I have just alluded will now be defined.

The inner ends of each series of pans are held in spaced relation and the device rendered rigid and given stability at the middle thereof by means of a metallic binding and stiffening strip D, (one for each series) riveted to the pans near the upper edges thereof. The outer ends of the pans of each series are similarly riveted to bands E, substantially like the strips D, passing continuously around both series of pans, thereby not only tying the outer ends of the pans together, but also tying the two series together, the sides of the outermost pans being also riveted to the bands E to support the same and assist in maintaining the space C between the adjacent ends of the two series.

The reinforced band E just described is preferably arranged near the upper edge of the pans beneath the turned-over or beaded margins thereof, and a like band F is passed around the two series of pans and riveted to the outer sides and ends thereof near the bottom of the same. Of course the bands may be secured in any suitable manner to constitute a fastening, the equivalent of the rivets referred to. By the construction above defined it will be appreciated that the device as a unit, although composed of a greater or less number of individual sections or pans, is tied together and reinforced in such a manner as to constitute a rigid strong device, capable, in a satisfactory manner to perform the functions intended to be accomplished thereby.

To effectually close the tops of the pans to confine therein the hot air or steam, thereby to maintain the bread during the baking operation in a soft condition, so that the resultant product will be substantially crustless, as compared to the conventional loaf of bread, I provide a top G conveniently of sheet metal, furnished with a depending flange $g$, reinforced at its margin by beading or otherwise, said top being of a size to fit over the entire device, that is all of the pans of the two series A, A'. The surrounding flange $g$ is adapted to depend against the outer ends and sides of the nest of pans, and the cover is temporarily locked in place by detachable catches, at the opposite ends thereof, engaging supplementary devices at the opposite ends of the nest of pans. The process of baking bread to render the same crustless by closing up the dough in the baking process and confining the hot air and steam within the pan I believe to be new with me, and as hereinabove suggested, the device herein specially set forth has been found efficacious in carrying said method into practical effect.

I claim:

A device for making bread comprising two series of independent pans, each pan having a bottom, sides and ends, the pans of each series and the two series of pans being separated by spaces therebetween at the adjacent sides and ends thereof, and means for securing the pans and series in their separated relation and to constitute a rigid unit, said means comprising strips secured to the adjacent inner ends of the pans to connect them together in series, a flat band surrounding the two series of pans at the sides and ends thereof arranged near the upper edges of the pans and secured to the said outer sides and ends, and an additional single flat band also surrounding both of the two series of pans at the sides and ends thereof arranged near but above the plane of the bottoms of the pans and also secured to the said outer sides and ends thereof to bridge the spaces between the ends of each series of pans and the spaces between the ends of the two series of pans.

In testimony whereof I affix my signature in presence of two witnesses.

WILLIAM J. GILLESPIE.

Witnesses:
JOHN J. QUINN,
CLARENCE J. YOUNG.